July 2, 1963 A. CECCHINI 3,096,424
TEMPERATURE CONTROL MEANS
Filed March 15, 1960 2 Sheets-Sheet 1

INVENTOR.
ANGELO CECCHINI
BY *Stanley Wald*
ATTORNEY

July 2, 1963  A. CECCHINI  3,096,424
TEMPERATURE CONTROL MEANS
Filed March 15, 1960  2 Sheets-Sheet 2

*INVENTOR.*
ANGELO CECCHINI
BY *Stanley Wald*
ATTORNEY

United States Patent Office 3,096,424
Patented July 2, 1963

3,096,424
TEMPERATURE CONTROL MEANS
Angelo Cecchini, 310 E. 163rd St., New York, N.Y.
Filed Mar. 15, 1960, Ser. No. 15,210
2 Claims. (Cl. 219—20)

The present invention relates generally to improvements in heating devices and it relates more particularly to an improved temperature regulated heating apparatus.

Many heating devices particularly those employed in industrial processes require close temperature control. This has been conventionally achieved by disposing a temperature responsive element either directly in the heated zone, in heat transfer relationship therewith or with heated objects or directly exposed thereto and controlling the energization of the heating element in accordance with the temperature of the temperature responsive element. Where the temperature responsive element is in the form of a thermocouple, thermistor or the like the employment of complex electronic equipment is generally necessary with its attendant drawbacks. On the other hand, where a switch operated by a bimetallic element is employed numerous limitations on its use are imposed and the apparatus is subject to frequent malfunctioning and breakdown, and at its best it possesses a low degree of accuracy. The bimetallic thermostatic switch of conventional construction can not be expeditiously used in corrosive atmospheres, in highly oxidizing atmospheres, in explosive atmospheres, or at very high temperatures. Further, these thermostatic switches are usually sensitive to movement and mechanical shock. It is thus apparent that the conventional bimetallic thermostatic switches, although it is characterized by its great simplicity, is not well adapted for use in kilns, industrial and metallurgical ovens and other high temperature heat treating equipment or in rapidly accelerating devices or devices subjected to mechanical shock.

It is therefore a principal object of the present invention to provide an improved heating apparatus.

Another object of the present invention is to provide an improved temperature regulated heating apparatus.

Still another object of the present invention is to provide an improved temperature regulated heating apparatus which may be employed at high temperatures in corrosive and oxidizing environments and under conditions of high mechanical shock.

A further object of the present invention is to provide an improved heating apparatus provided with a temperature regulating mechanism remote from the heated area.

Still a further object of the present invention is to provide a heating apparatus of the above nature characterized by its simplicity, low cost, ruggedness and versatility.

The above and other objects of the present invention will become apparent from a reading of the following description taken in conjunction with the accompanying drawings wherein.

Figure 1:
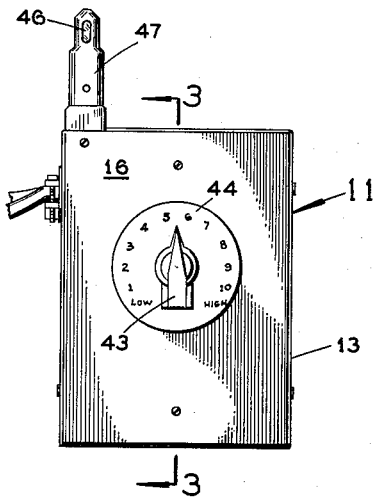
FIGURE 1 is a front elevational view of the temperature regulating section of a heating apparatus embodying the present invention.
Figure 2:
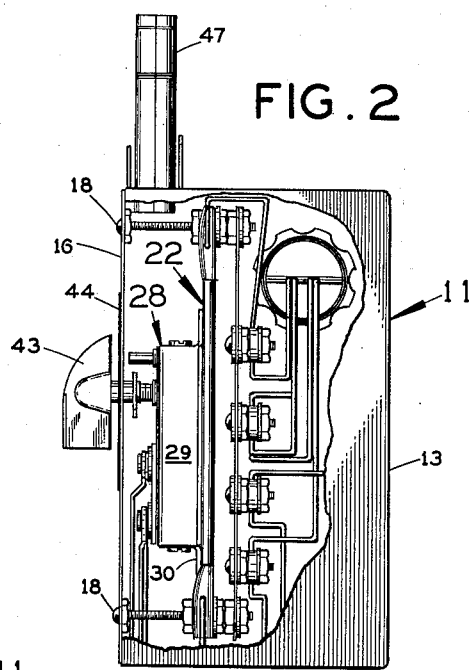
FIGURE 2 is an enlarged side elevational view thereof shown partially broken away.
Figure 3:
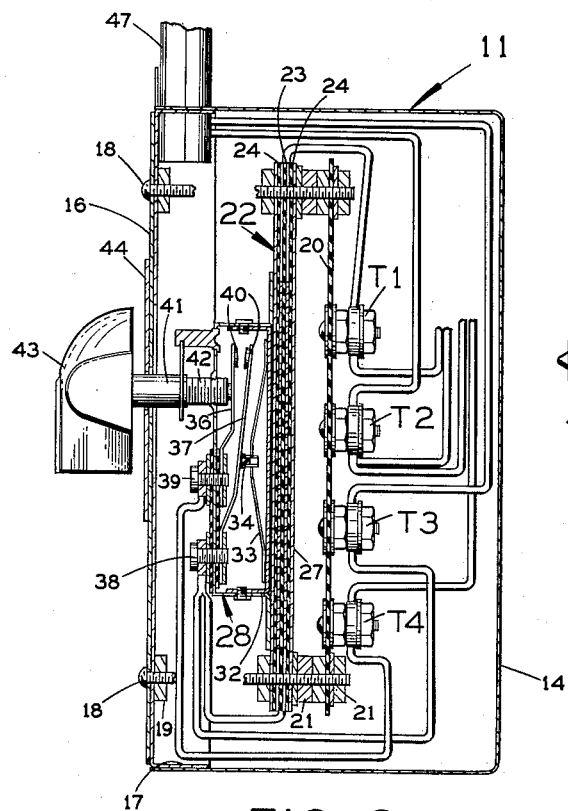
FIGURE 3 is an enlarged cross-sectional view taken along line 3—3 in FIGURE 1.
Figure 4:
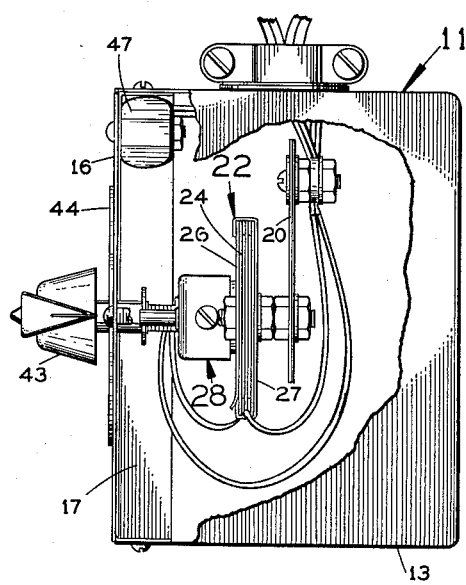
FIGURE 4 is a top plan view thereof, partially broken away.

In a sense the present invention contemplates the provision of an improved heating apparatus comprising means defining a main heating zone, a main electric resistance heating element disposed in said main heating zone, means defining a housing delineating a sample heating zone thermally isolated from said main heating zone, a sampling electric resistance heating element disposed in said sample heating zone and temperature responsive means located in said sample heating zone and simultaneously connecting said heating elements to a source of electric current when the temperature in said sample zone drops below a predetermined temperature and disconnects said heating elements from said source when said sample zone temperature exceeds said predetermined temperature whereby to regulate the temperature of said main heating zone.

The sample zone housing is remote from the main heating zone, from a few inches to over several hundred feet. With the above arrangement the main and sample heaters are simultaneously energized and deenergized to maintain the temperature in the sample zone constant. It has been found that the main heating zone likewise reaches an equilibrium temperature that is automatically regulated at this temperature. The ratio of the regulated equilibrium temperatures of the sampling zone to the main heating zone depends upon the heat dissipating characteristics of these zones and the heating properties of the heating elements when energized in circuit. The relationship between the regulated equilibrium temperatures of the sampling and main heating zones and hence the calibration of the thermostatic control switch and index dial are best determined empirically. This is accomplished by energizing the subject heating apparatus under normal work load conditions and bringing the main heating zone to a series of equilibrium temperatures by adjusting the thermostatic switch. These main heating zone equilibrium temperatures are then measured by conventional means and the thermostatic switch dial correspondingly calibrated. It should be noted that the sensitivity of the control depends on the thermostatic switch sensitivity and in part on the thermal inertia of the sampling heating zone and heating member. By decreasing this inertia, as by venting the housing and reducing the mass of the sample heating member and switch, the sensitivity may be increased. While at low heating zone temperatures, the temperatures of the main heating zone and sampling zone may be substantially the same or of the same order, at higher heating zone temperatures, that is above about 300° F. to 400° F., the regulated sampling zone temperature should be less than the main heating zone temperature. The sampling heating zone regulated temperature should advantageously be less than 300° F. This temperature differential is primarily effected by employing a lower wattage heater in the sampling zone than in the main heating zone which advantageously consumes between 2 and 100 watts. The sampling zone heater, when employed in the above circuit, should preferbaly have a resistance of between about 5% and 50% of the main heating element.

Referring now to the drawings and more particularly to FIGURES 1 to 5 thereof which illustrate a preferred embodiment of the present invention, the reference numeral 10 generally designates a heating device and the numeral 11 the heat regulating mechanism or device. The heating device 10 includes a main heating electric resistance element R1 which is located in the main heating zone either directly or in close thermal communication therewith. It is important to note that the heating device 10 and the regulating device 11 are spaced and thermally isolated from each other and that the main heating device 10 does not significantly effect the temperature of the regulating device 11. The heating device 10 may be of any desired type wherein the range of temperature regulation may extend from as low as close to room temperature to as high as about 6000° F. Examples of such devices are heat treating ovens, kilns, pots, vats, furnaces, platens, tunnel heaters and like equipment for various and diverse uses, the heat treated objects or material being either moving or stationary as desired. The value and rating of the resistance heater R1 depends upon the temperature and heat dissipation of the heating device 10 and the voltage applied to the heater as is well known is the art.

The regulating device 11 includes a light gauge sheet metal housing 13 consisting of a rectilinear shell 14 and a removal front cover plate 16. The cover plate 16 is provided with a peripheral lip 17 nesting in the shell 14 and secured to the abutting wall by sheet metal screws. A pair of vertically spaced mounting post defining screws 18 project rearwardly from the front plate 16 and are secured thereto by means of nuts 19. A terminal strip 20 is supported by and between the inner free ends of the screws 18 and fixed in position by opposing nuts 21, engaging the screws 18. The strip 20 is formed of mica sheet or other suitable insulating heat resistant material and carries a plurality of spaced screw type terminal posts T1, T2, T3, and T4.

A control heating member 22 is also supported by and between the mounting posts 18 anterior to the terminal strip 20. The heating member 22 includes a core member 23 formed of an elongated rectangular mica sheet about which is wound a helical ribbon type electrical resistance element R2 terminating at opposite ends of the core member 23. The resistance carrying core member 23 is sandwiched between one or more pairs of rectangular mica sheets 24 extending beyond and of corresponding larger dimensions than the core member 23. The assembled sandwich is clamped between a pair of front and rear metal plates 26 and 27 respectively, the longitudinal borders of the plate 27 being shaped to tightly engage the corresponding border of the front plate 26 to complete the heater 22. The heater 22 has apertures formed in opposite ends thereof beyond the resistance element R2 which engages the respective posts 18.

Mounted on the front face of the heater member metal plate 26 is an adjustable thermostatic switch 28 which is closed below and open above the adjustable preset temperature. The switch 28 includes a metal housing 29 the end walls of which are provided with ears 30 welded to the plate 26. The base 32 of the housing 29 abuts the plate 26 and has upstanding lugs which are fastened to the housing end walls by suitable screws. An arched or bowed metal strip 33 has its lower free ends welded to the ends of the housing base 32 and has a smaller thermal coefficient of expansion than the base 32. Thus the arched strip 33 and the base 32 define a temperature responsive bimetallic member, the apex of which rises and falls with decreases and increases in temperature respectively. A headed ceramic actuating button 34 is carried by and registers with an opening in the apex of the strip 33.

Suitably mounted on the lower inner face of the switch housing front wall are a pair of front and rear resilient metal switch arms 36 and 37 respectively. The switch arm 37 is rearwardly sprung and bears against the ceramic button 34, the lower end of the arm 37 being affixed to the lower end of the housing front wall and electrically connected to a screw terminal 38. The switch arm 36 is forwardly sprung and has its lower end affixed to the housing front wall directly above the lower end of switch arm 37 and is electrically connected to a second switch screw terminal 39. The free ends of the switch arms carry confronting contact elements 40.

In order to adjust the temperature response of the switch 28 there is provided a shaft 41 having a threaded inner end section 42 engaging a mating tapped aperture in the switch housing front wall. The inner end face of the shaft 41 bears against the front face of the switch arm 36 so that the position of the forward contact and hence the switch responding temperature may be adjusted by rotating the shaft 41. The shaft 41 projects through an opening in the regular housing front wall 16 and carries at its forward end an indicator knob 43. An indicia bearing dial 44 is mounted on the housing front wall 16 and registers with the indicator knob 43. It is apparent from the above that the bowed element 33 actuates the switch arm 37 in accordance with the immediate ambient temperature as controlled and modified solely by the heater 22 under normal conditions and to open and close the switch contacts 40 at temperature controlled by the shaft 41.

Figure 5:
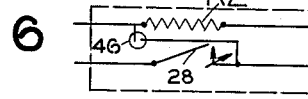
FIGURE 5 is a schematic view of a heating apparatus employing the temperature regulator illustrated in FIGURES 1 to 4.

The opposite ends of the heater element are connected to the terminal T1 and switch terminal 38, the terminal T1 being connected to one conductor of a two conductor cable which is connected to a suitable electric power source the other conductor thereof being connected to the terminal T2. A second two conductor power cable is connected at one end to the opposite terminals of the main heating element R1 and at its other end to the terminals T2 and T4. The terminal T4 is connected to the switch terminal 39 and the terminal T3 is connected to the switch terminal 38. A neon indicator bulb 46 is mounted in a standard 47 projecting upwardly from the top wall of the housing 14 and is connected between the terminals T3 and T4. It should be noted, as shown in FIGURE 5 of the drawing, as a safety measure, a second regulating device 49 similar in construction to the regulator device 11 may be connected in tandom between the first regulator 11 and the heating element R1. Specifically the output cable of the regulator 11 is connected to the input cable of the regulator 49 the output cable of which is connected to the terminals of the heating element R1. The responding temperature of the thermostatic switch is adjusted to a temperature corresponding to the maximum safe temperature of the heating apparatus 10 and higher than that of the regulator 11. Thus if the switch contacts of regulator 11 should jam closed for any reason the switch contacts of regulator 49 will open before the danger temperature is reached. This latter condition will be indicated by the lighting of the neon bulb in the regulator 49. Of course, any suitable visual or audible indicator such as a bell or the like may be substituted for the second regulator neon bulb. It should be noted that in place of a second regulator 11, a second thermostatic switch may be connected in series with the first switch 28, disposed in the regulator housing 13, and adjusted to the higher response temperature.

The operation of the improved heating apparatus is apparent from the above description. The dial 44 is calibrated in the manner previously set forth and the shaft 41 adjusted to the desired temperature of the heating device as indicated by the knob 43. The switch 28 will close by reason of the relatively cool ambient temperature to energize heating elements R1 and R2. During equilibrium operating conditions, as earlier explained, the thermostatic switch 28 will open when the temperature thereof is above the adjusted predetermined temperature to simultaneously deenergize the heating elements R1 and R2. The heating device and regulating device 10 and 11 will then cool until the switch is closed by reason of the dropping temperature again energizing the both heating elements. The temperature of the heating device 10 is thus maintained at an adjustable constant temperature, a regulation as close as 1° F. being attainable. The temperature range of the heating device 10 may be as high as 6000° F. with that in the regulator not requiring a temperature exceeding 300° F.

Figure 6:
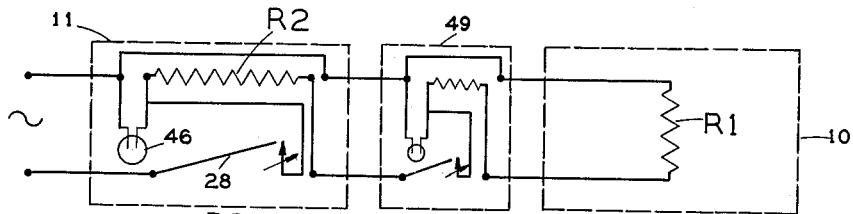
FIGURE 6 is a schematic view of another form of temperature regulator in accordance with the present invention.
Figure 7:
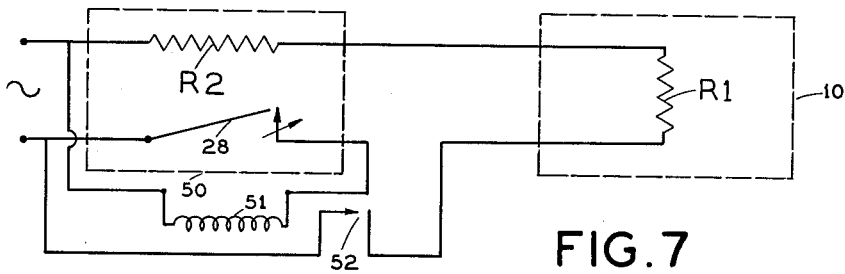
FIGURE 7 is a schematic view of a modified form of heating apparatus embodying the present invention.

As seen in FIGURE 6 of the drawings the wiring of the heater element R2 and the switch 28 may be modified. The resistance heating element R2 is connected directly between one of the input cable conductors and one of the output cable conductors, and the thermostatic switch 28 is connected between the other input cable conductor and the other output cable conductor. The indicator bulb is connected between the switch terminal connected to the output conductor and the resistance terminal connected to the input conductor. The operation adjustment and calibration of this regulator is similar to that previously described.

Where the power consumption of the heating device 10 exceeds 2000 watts it is desirable to employ a relay to control the current to the main heater element R1. A system employing a relay and a regulator network similar to the regulator 11 but wired somewhat differently is illustrated in FIGURE 7. The construction and physical arrangement of the components of the regulator are similar to that previously described. There is provided a relay 50 external to the regulator housing 13 and including a solenoid 51 and armature actuated normally open relay contacts 52. The terminals of the heater element R1 are connected by way of the two conductor cable through the relay contacts 52 and through the heating element R2 respectively to the opposite conductors of the regulator input cable, which, as aforesaid, is connected to a source of current. The relay solenoid 51 is connected in series with the thermostatic switch 28 between the current connected input cable conductors. Thus upon the closing of the switch 28, the relay solenoid 51 is energized closing the contacts 52 to connect the heating elements R1 and R2 in series with the current source to energize the heating elements. When the switch 28 is opened the relay solenoid 51 is deenergized and the contacts 52 opened thereby deenergizing the heater elements R1 and R2. In all other respects the operation of the present apparatus is similar to that earlier described.

Figure 8:
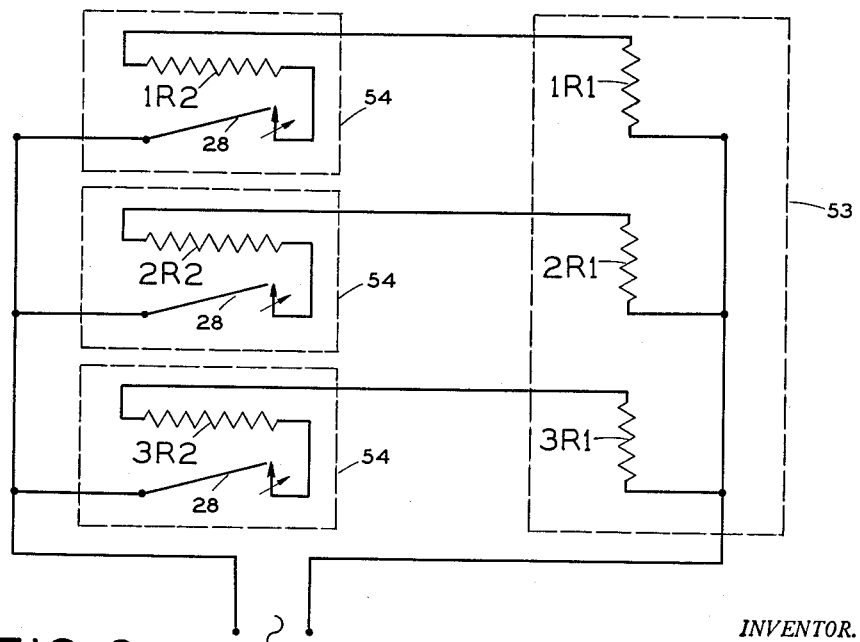
FIGURE 8 is a schematic view of another embodiment of the present invention wherein zone heating is employed.

Referring now to FIGURE 8, of the drawings which illustrates another embodiment of the present invention as applied to a multizone heating apparatus, the numeral 53 designates a heating device including a plurality of main electric resistance heating elements, 1R1, 2R1, and 3R1, respectively which may be of the same or of different values, as desired. Associated with each of the main heating elements is a spaced thermally isolated regulator device 54 each including a thermostatic switch 28 and associated control heating elements 1R2, 2R2, and 3R2 respectively. The mechanical arrangement and construction of the regulator 54 and the components thereof are as previously described the values of the main heating element and control heating elements depending, as aforesaid, on the temperature and heat dissipating parameters of the systems. Each of the main heating elements 1R1, 2R1 and 3R1 are connected in series with a corresponding control heating element 1R2, 2R2 and 3R2 and the associated thermostatic switch 28 to a source of current. Except for the fact that there are a plurality of main heating elements and respective individual regulating devices the operation of the last described embodiment is similar to that first described. It should be noted however, that in calibrating the regulating devices the full heating device 53 should be at its preset equilibrium temperatures.

It is apparent from the above that there has been provided an improved heating apparatus which may be closely temperature regulated over a wide range and which is characterized by its simplicity, ruggedness, versatility, flexibility and low cost.

While there have been described and illustrated preferred embodiments of the present invention it is apparent that numerous alterations omissions and additions may be made without departing from the spirit thereof.

What is claimed is:

1. A heating apparatus comprising means defining a main heating zone, a main electric resistance heating element disposed in said main heating zone, means defining a housing delineating a sample heating zone thermally isolated from said main heating zone and substantially unaffected by the temperature therein, a sampling electric resistance heating element disposed in said sample heating zone, a thermostatic switch located in said sample heating zone, said thermostatic switch being open above a predetermined temperature and closed below a predetermined temperature, said main and sampling resistance elements being connected to a source of electric current through said switch and the heating of said sample heating zone being effected substantially solely by said sampling electric resistance heating element, means defining a second housing delineating a second sample heating zone thermally isolated from said main heating zone, a second sampling electric resistance heating element disposed in said second sample heating zone and a second thermostatic switch located in said second sample heating zone and responsive at a higher corresponding main zone temperature than said other thermostatic switch, said thermostatic switches being connected in series and said second heating element being connected to a source of current through said second switch.

2. A heating apparatus comprising means defining a main heating zone, a main electric resistance heating element disposed in said main heating zone, a housing spaced and thermally isolated from said heating zone and substantially unaffected by the temperature therein, a second electrical resistance heating member disposed in said housing and spaced from the walls thereof and a thermostatic switch carried by and in heat conducting relationship with said second electrical resistance heating element and being heated substantially solely thereby, said main heating element and said second heating member being connected to a source of current through said thermostatic switch to be simultaneously energized and deenergized, said second heating member including an insulating core about which is helically wound an electrical resistance element and a pair of insulating sheets sandwiching said resistance element carrying core and a pair of parallel metal plates clamping said sandwich, said thermostatic switch being affixed to one of said metal plates.

References Cited in the file of this patent
UNITED STATES PATENTS

| | | |
|---|---|---|
| 2,662,155 | Holmes | Dec. 8, 1953 |
| 2,780,414 | De Heer | Feb. 5, 1957 |
| 2,836,695 | Johnson | May 27, 1958 |
| 2,841,982 | Johnson | July 8, 1958 |
| 2,847,553 | Smith | Aug. 12, 1958 |
| 2,896,058 | Perryman | July 21, 1959 |

FOREIGN PATENTS

| | | |
|---|---|---|
| 888,469 | France | Sept. 6, 1943 |